United States Patent [19]

Lichy

[11] Patent Number: 5,522,057
[45] Date of Patent: May 28, 1996

[54] HYBRID WRITE BACK/WRITE THROUGH CACHE HAVING A STREAMLINED FOUR STATE CACHE COHERENCY PROTOCOL FOR UNIPROCESSOR COMPUTER SYSTEMS

[75] Inventor: Joe Lichy, Sunnyvale, Calif.

[73] Assignee: Intel Corporation, Santa Clara, Calif.

[21] Appl. No.: 142,199

[22] Filed: Oct. 25, 1993

[51] Int. Cl.$^6$ .................................................. G06F 12/08
[52] U.S. Cl. ...................... 395/471; 395/469; 395/470; 395/472; 395/473; 364/DIG. 1; 364/DIG. 2; 364/243.41; 364/238.4
[58] Field of Search .......................... 364/200 MS File, 364/900 MS File; 395/425, 468, 469, 470, 471, 472, 473

[56] References Cited

U.S. PATENT DOCUMENTS

| | | | |
|---|---|---|---|
| 4,755,930 | 7/1988 | Wilson, Jr. et al. | 395/449 |
| 4,959,777 | 9/1990 | Holman, Jr. | 395/468 |
| 5,119,485 | 6/1992 | Ledbetter, Jr. et al. | 395/473 |
| 5,146,603 | 9/1992 | Frost et al. | 395/470 |
| 5,241,664 | 8/1993 | Ohba et al. | 395/448 |
| 5,297,269 | 3/1994 | Donaldson et al. | 395/472 |
| 5,303,362 | 4/1994 | Butts, Jr. et al. | 395/448 |
| 5,325,503 | 6/1994 | Stevens et al. | 395/473 |
| 5,353,415 | 10/1994 | Wolford et al. | 395/306 |
| 5,355,467 | 10/1994 | MacWilliams et al. | 395/473 |
| 5,369,753 | 11/1994 | Tipley | 395/449 |
| 5,394,555 | 2/1995 | Hunter et al. | 395/800 |
| 5,426,765 | 6/1995 | Stevens et al. | 395/458 |

*Primary Examiner*—Matthew M. Kim
*Attorney, Agent, or Firm*—Blakely, Sokoloff, Taylor & Zafman

[57] ABSTRACT

A cache controller of a hybrid write back/write through cache of a uniprocessor system is provided with state transition and complimentary logic that implements a streamlined (modified, exclusive, shared and invalid) MESI cache coherency protocol, (modified, exclusive, pseudo shared and invalid) MEΣI, having a pseudo shared state "Σ". Under the streamlined MEΣI, a cache line will enter the Σ state only through allocation. From the Σ state, the cache line will remain in the Σ state when it is read, written into, or snoop-inquired, and it will transition into the I state when it is snoop-invalidated. Additionally, if a cache line in the Σ state is written into, the cache controller will always cause the data to be written to memory, effectively treating the cache line as a dedicated write through cache line.

19 Claims, 7 Drawing Sheets

| PRESENT STATE | CYCLES | NEXT STATE |
|---|---|---|
| M | READ, WRITE<br>SNOOP-INQUIRE<br>SNOOP-INVALIDATE | M<br>E<br>I |
| E | WRITE<br>SNOOP-INQUIRE<br>SNOOP-INVALIDATE | M<br>E<br>I |
| Σ | READ, WRITE, SNOOP-INQUIRE<br>SNOOP-INVALIDATE | Σ<br>I |
| I | READ (WRITEBACK SEL'D @ ALLOCATE)<br>READ (WRITETHROUGH SEL'D @ ALLOCATE)<br>READ (LOC UNCACHEABLE), WRITE, SNOOP-INQ/INV | E<br>Σ<br>I |

HYBRID WRITE BACK/WRITE THROUGH CACHE HAVING A STREAMLINED FOUR STATE CACHE COHERENCY PROTOCOL FOR UNIPROCESSOR COMPUTER SYSTEMS

BACKGROUND OF THE INVENTION

1. Field of the Invention

The present invention relates to the field of computer systems, in particular, uniprocessor computer systems having cache memory and allowing direct memory accesses by input/output devices. More specifically, the present invention relates to methods and apparatus employed by these systems to maintain cache coherency.

2. Background

Cache memory is well known in the art. Historically, the early caches were introduced at a time when memory was accessed exclusively by the (central processing unit (CPU). For obvious performance reasons, these early caches tended to be write back caches. With the advent of direct memory access by the input/output devices, many of the caches employed were switched to write through caches. A write through cache was and still is a simple way to side step the issue of maintaining cache coherency between the cache and main memory. The obvious drawback is that the performance advantage of write back cache from making fewer memory accesses is sacrificed.

Figure 1:
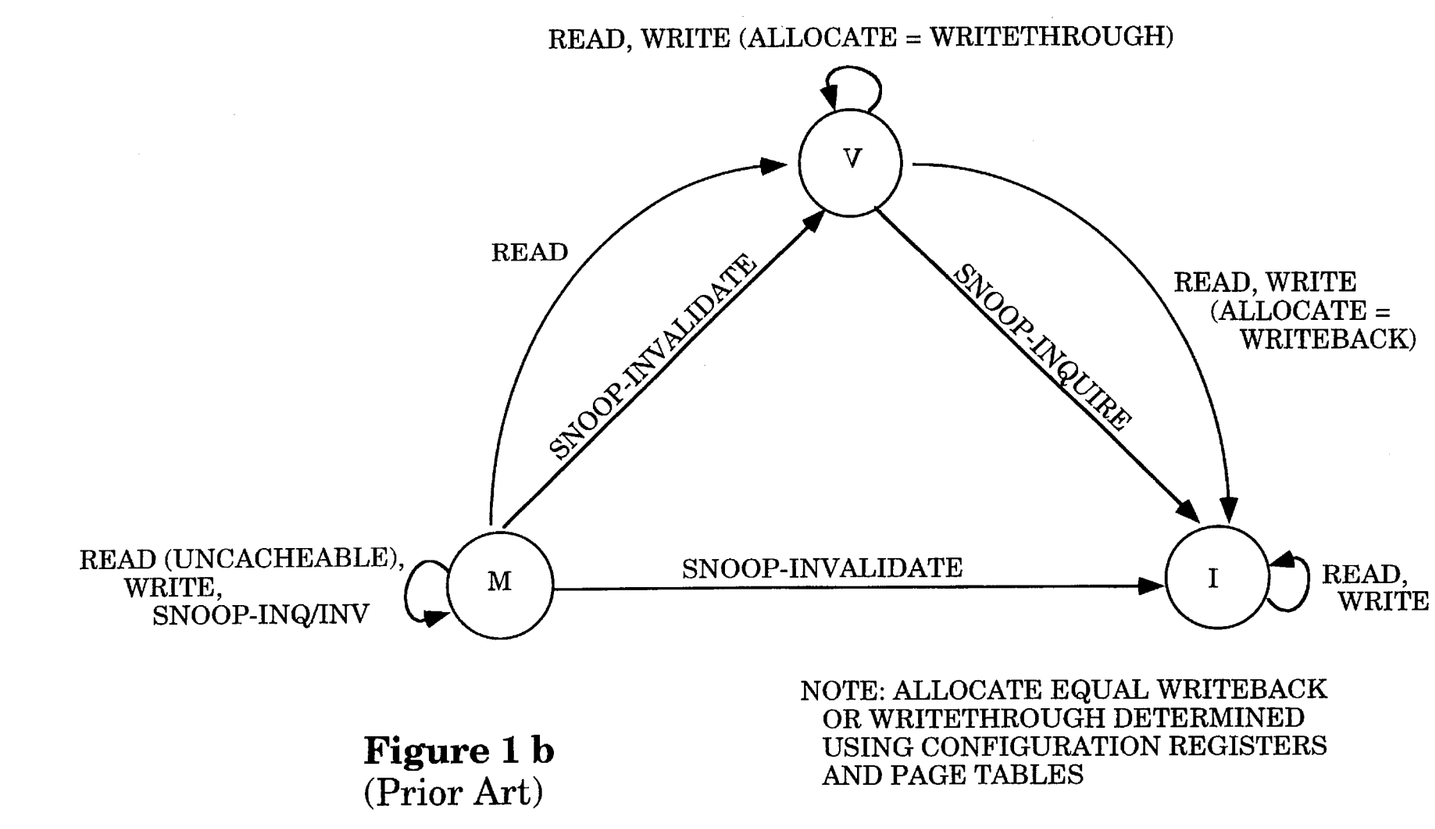
FIGS. 1a–1b illustrate two exemplary prior art cache coherency protocols.
Figure 1A:
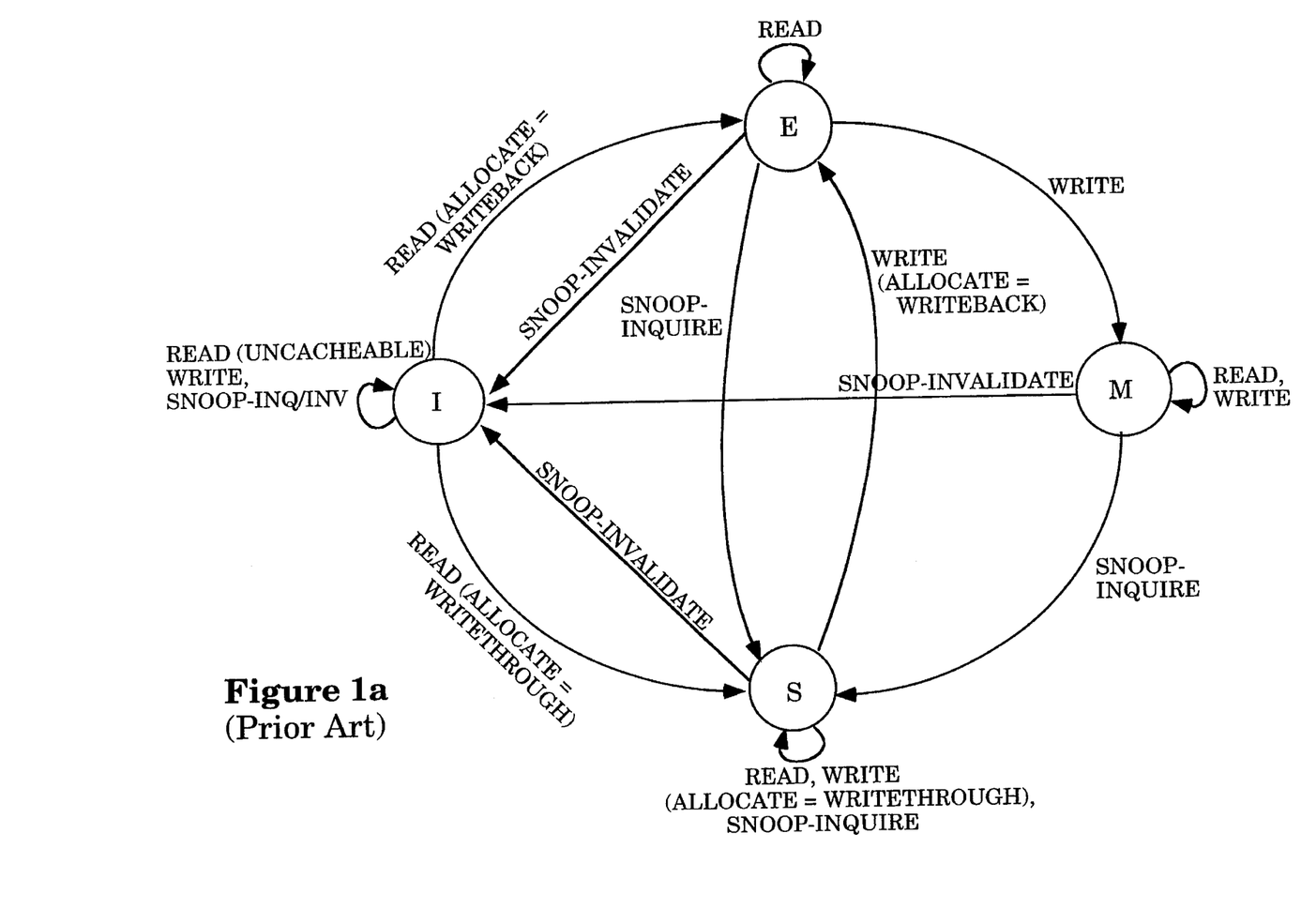

It would, of course, be preferable to implement a write back cache so the above mentioned sacrifice could be avoided, particularly on multiprocessor systems. As a result, various cache coherency protocols were developed in the industry. Among them is the four state (modify, exclusive, shared, and invalid) MESI protocol (see FIG. 1). Under the MESI protocol, the cache memory is actually a hybrid write back/write through cache with the write back characteristic determined on a line by line basis. In recent years, the MESI protocol has actually emerged as one of more widely accepted industry standards, particularly for microprocessor based multiprocessor systems.

As technology continues to drive down the cost of microprocessor based computer systems allowing more functions to be provided, it is not uncommon to find these days that even the low end microprocessor based uniprocessor systems are provided with cache memory. For many of these uniprocessor systems, in order to exploit the performance advantage of write back cache, the same MESI protocol is employed to maintain cache coherency. Since the MESI protocol was originally designed for multiprocessor systems, it contains functions that are unnecessary for uniprocessor systems. In other words, the MESI protocol is more complicated and more costly than necessary for the uniprocessor environment. Therefore, for other uniprocessor systems, attempts have been made to develop and employ simpler and lesser cost cache coherency protocols. A particular example is the three state (modified, valid, and invalid) MVI protocol (see FIG. 1b). However, protocols such as the three state MVI protocol have the disadvantage of requiring additional auxiliary configuration registers to be employed if the function of determining write characteristic on a line by line basis is provided. The additional auxiliary configuration registers are undesirable in a number of ways. First of all, they require additional look ups to determine whether write backs to memory should be performed immediately or they can be deferred. The additional look ups impact performance. Secondly, they require real estate. The real estate requirement is particularly undesirable if the cache memory is to be integrated as part of the microprocessor chip, commonly known as on-chip cache.

Thus, it is desirable to provide a cache coherency protocol for a uniprocessor system that is less complicated and less costly than the four state MESI protocol, however, without the disadvantages of the three state MVI protocol. As will be disclosed, the streamlined four state hybrid write back/write through cache of the present invention advantageously achieves the above described desired results.

SUMMARY OF THE INVENTION

Under the present invention, the desired results are advantageously achieved by providing the cache controller of a hybrid write back/write through cache of an uniprocessor system with state transition and complementary logic that implements a streamlined (modified, exclusive, shared and invalid) MESI cache coherency protocol, (modified, exclusive, pseudo shared and invalid) ME$\Sigma$I, having a pseudo shared state "$\Sigma$". Under the streamlined ME$\Sigma$I, a cache line will enter the $\Sigma$ state only through allocation. From the $\Sigma$ state, the cache line will remain in the $\Sigma$ state when it is read, written into, or snoop-inquired, and it will transition into the I state when it is snoop-invalidated. Additionally, if a cache line in the $\Sigma$ state is written into, the cache controller will always cause the data to be written to memory, effectively treating the cache line as a dedicated write through cache line. As a result, cache coherency is maintained without the complexity and cost of the prior art MESI protocol, but without the disadvantages of the prior art MVI protocol.

DETAILED DESCRIPTION PRESENTLY PREFERRED AND ALTERNATE EMBODIMENTS

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention unnecessarily.

Figure 2:
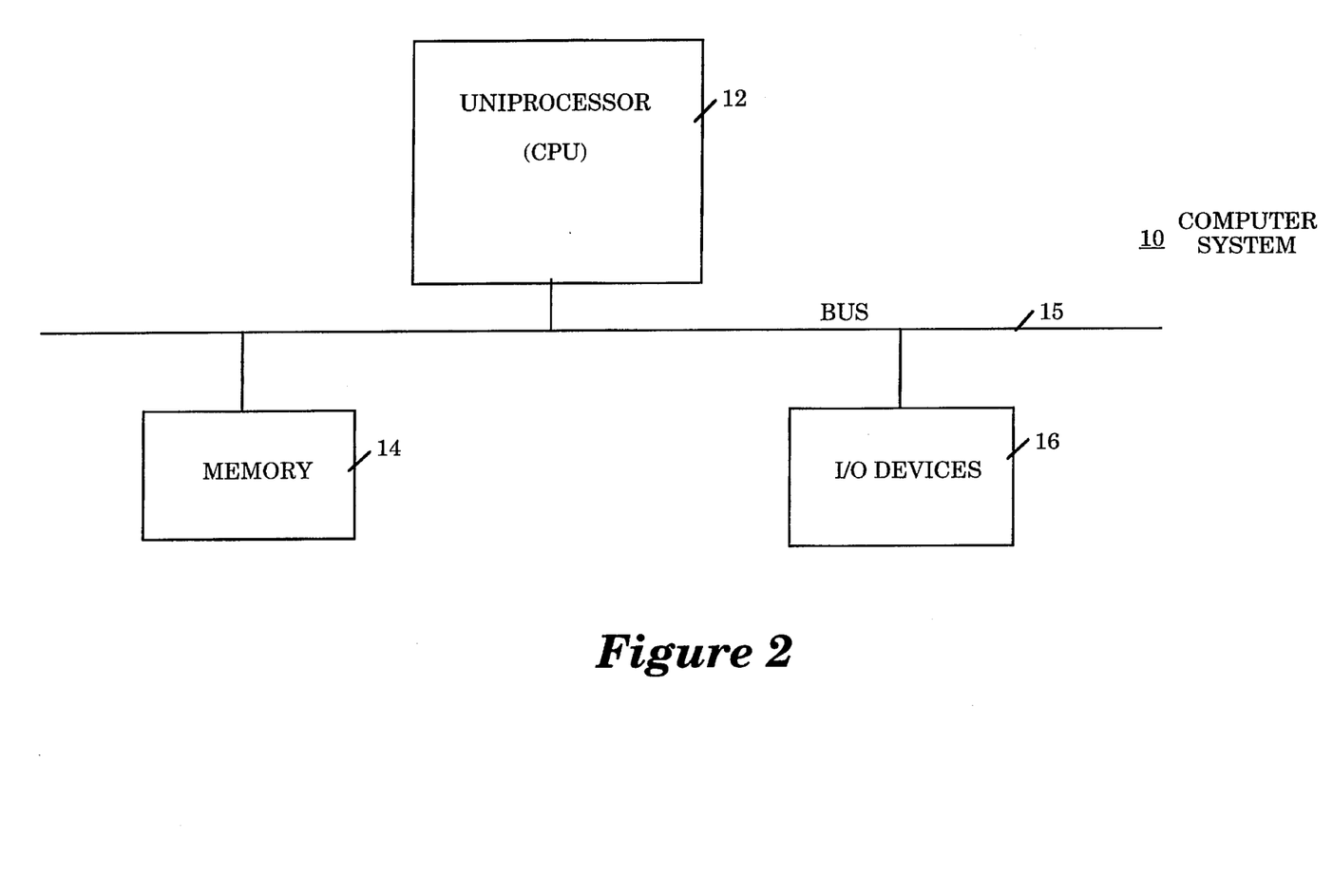
FIG. 2 illustrates an exemplary computer system incorporating the teachings of the present invention.

Referring now to FIG. 2, a block diagram illustrating an exemplary computer system incorporating the teachings of the present invention is shown. The exemplary computer system 10 comprises a single central processing unit (CPU) 12 incorporated with the teachings of the present invention, a memory unit 14, a number of input/output (I/O) devices 16, and a system bus 15 coupled to each other as shown. The memory unit 14 is accessed by the I/O devices 16 directly as well as by the CPU 12 through the system bus 15. The memory unit 14, the I/O devices 16, and the system bus 15 are intended to represent a broad category of these elements found in many uniprocessor as well as multiprocessor computer systems. Their constitutions and functions are well known and will not be further described. The CPU 12 will be described in further detail below with additional references to the remaining figures.

Figure 3:
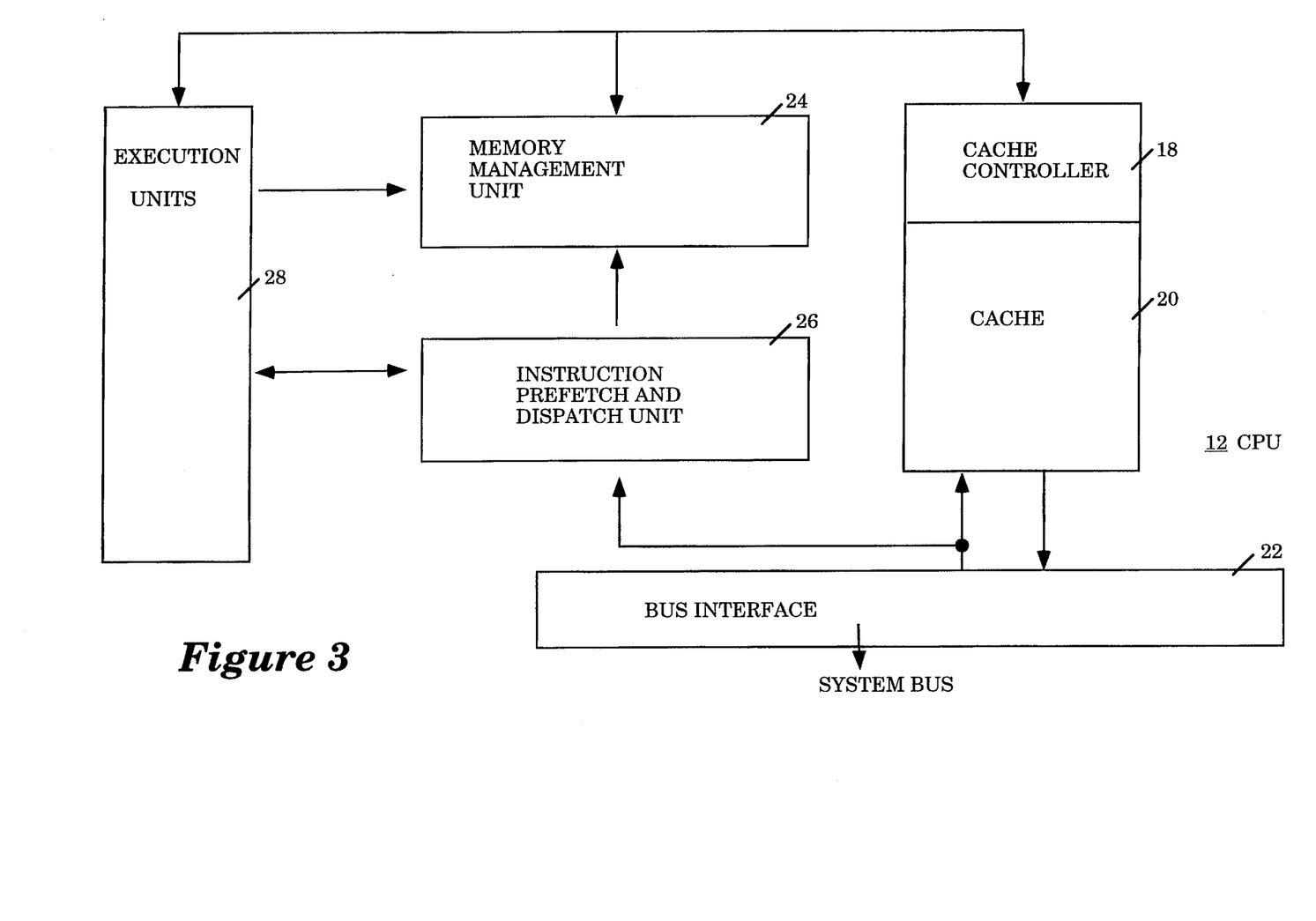
FIG. 3 illustrates the relevant portions of one embodiment of the uniprocessor of FIG. 2 in further detail.

Referring now to FIG. 3, a block diagram illustrating the relevant portions of one embodiment of the uniprocessor of FIG. 2 in further detail is shown. The CPU 12 comprises a bus interface 22, an instruction prefetch and dispatch unit 26, a memory management unit 24, a cache controller 18 incorporated with the teachings of the present invention, a unified n-way set associative cache 20, and an execution unit 28 coupled to each other as shown. In the presently preferred embodiment, the CPU 12 is disposed on a single silicon based chip. Together the various elements 18–22 cooperate to fetch, issue, execute, and save execution results. In particular, the cache controller 18 controls all accesses to the memory unit 14, providing data directly from the cache 20 if they are already cached there, refreshing the content of cache 20 as appropriate, and maintaining cache coherency with the main memory 14. The bus interface 22 supports the assertion of a signal (WB/WT#) indicating whether a cache line at allocation time should be allocated with a write back (WB/WT#=high) or write through (WB/WT#=low) characteristic. The cache memory 20, the bus interface 22, . . . , and the execution unit 28 are also intended to represent a broad category of these elements found in many processors. Their constitutions and functions are well known and will not be otherwise further described. The cache controller 18 will be described in further detail below with additional references to the remaining figures.

Before describing the cache controller further, it should be noted that while the present invention is being described with the exemplary computer system described above, the present invention is not limited to the architecture described. Based on the description to follow, it will be appreciated that the present invention may be practiced in a variety of architectures, including but not limited to architectures with multiple execution units (e.g. integer, floating point, graphics, load and store), and/or separate instruction and data caches. The cache(s) may also be mapped in other well known manners. It will be further appreciated that the elements may be disposed on multiple semiconductor chips based on a variety of other semiconductor materials.

Figure 4:
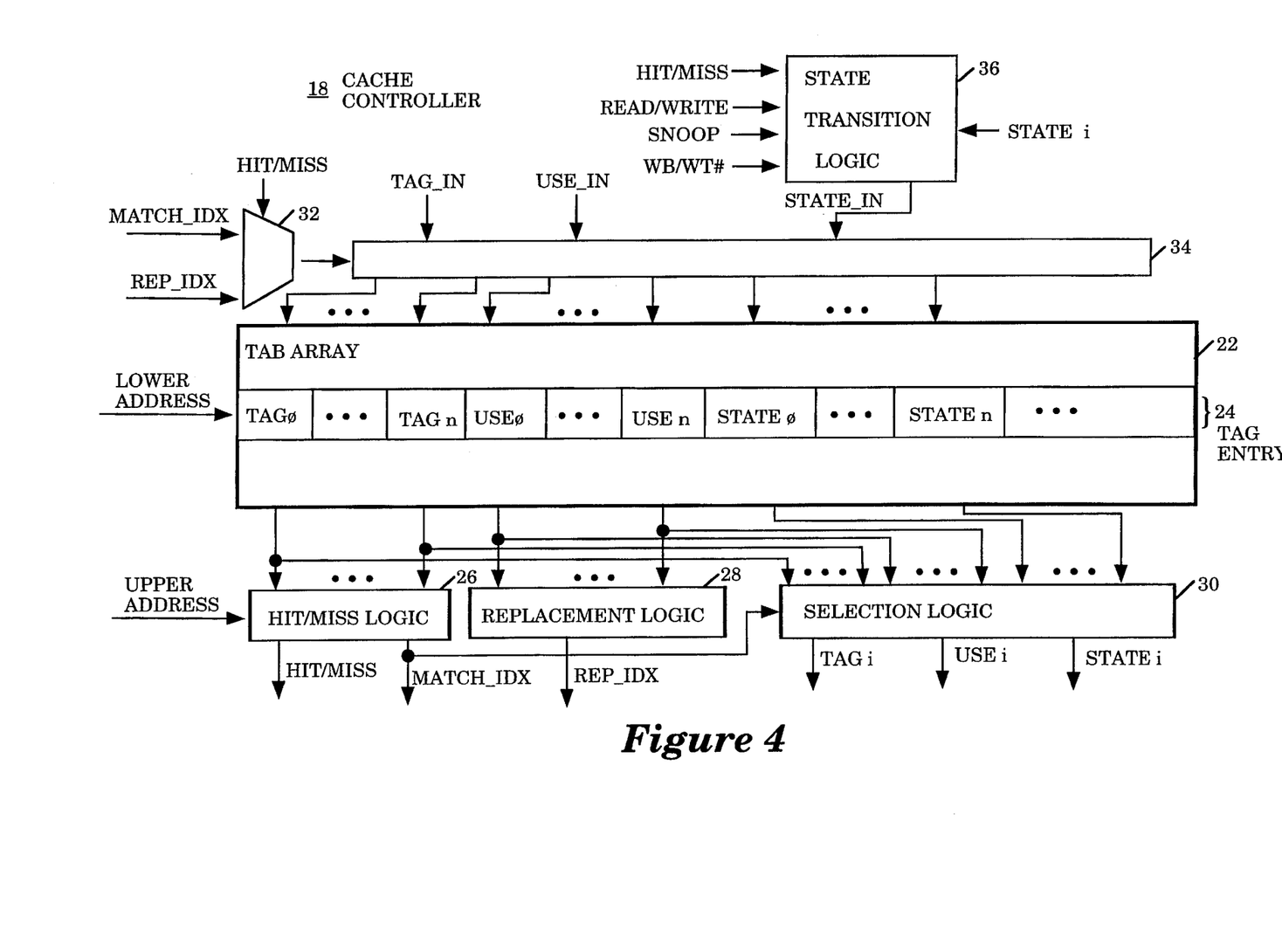
FIG. 4 illustrates the relevant portions of one embodiment of the cache controller of FIG. 3 in further detail.

Referring now to FIG. 4, a block diagram illustrating the relevant portions of one embodiment of the cache controller of FIG. 3 in further detail is shown. The cache controller 18 comprises a tag array 22 having a number of tag entries 24 corresponding to a number of associated sets of cache lines in the unified cache 20. Each tag entry 24 has a number of address tags, usage, state, and other control information corresponding to a set of associated cache lines. The state information identifies the current state of the corresponding cache line for the purpose of cache coherency, which will be further described below. Additionally, the cache controller 18 comprises state transition and other complementary logic 26–36 for determining cache hits/misses, identifying matching cache lines, selecting cache lines for replacement, and maintaining address tags, usage, state and other control information. The state transition logic 36 generates the new states of the cache lines based on their current states, and a number of transitional conditions. Except for the streamlined MEΣI protocol implemented by the state transition and complementary logic 26–36, they are intended to represent a broad category of these elements found in many computers. Their constitutions and functions are well known and will not be otherwise further described. The streamlined four state MEΣI cache coherency protocol of the present invention will be described in further detail below with additional references to the remaining figures.

Figure 5A:
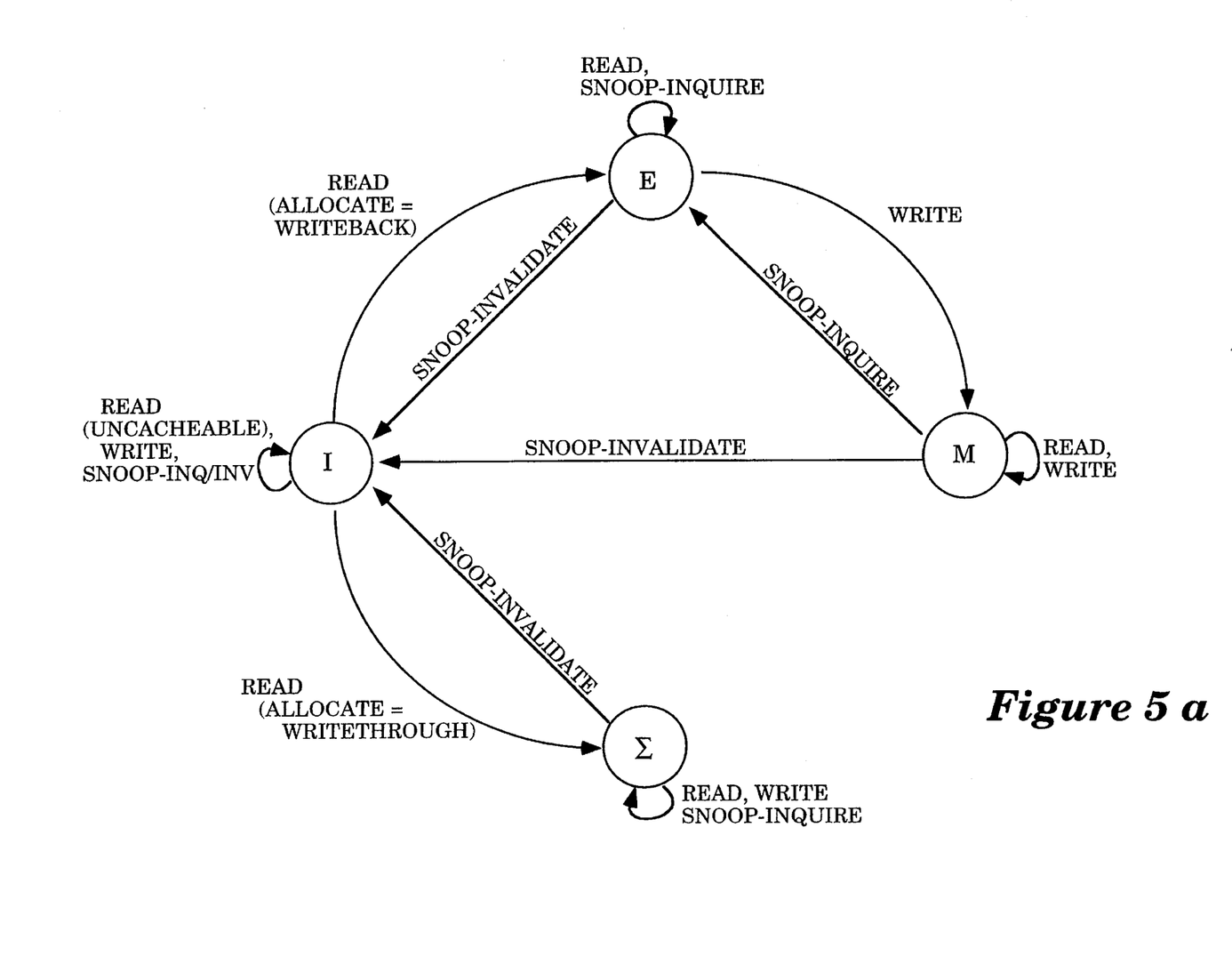
FIGS. 5a–5b illustrate the streamlined four state ME$\Sigma$I cache coherency protocol of the present invention implemented by the state transition and complementary logic of FIG. 4.
Figure 5B:
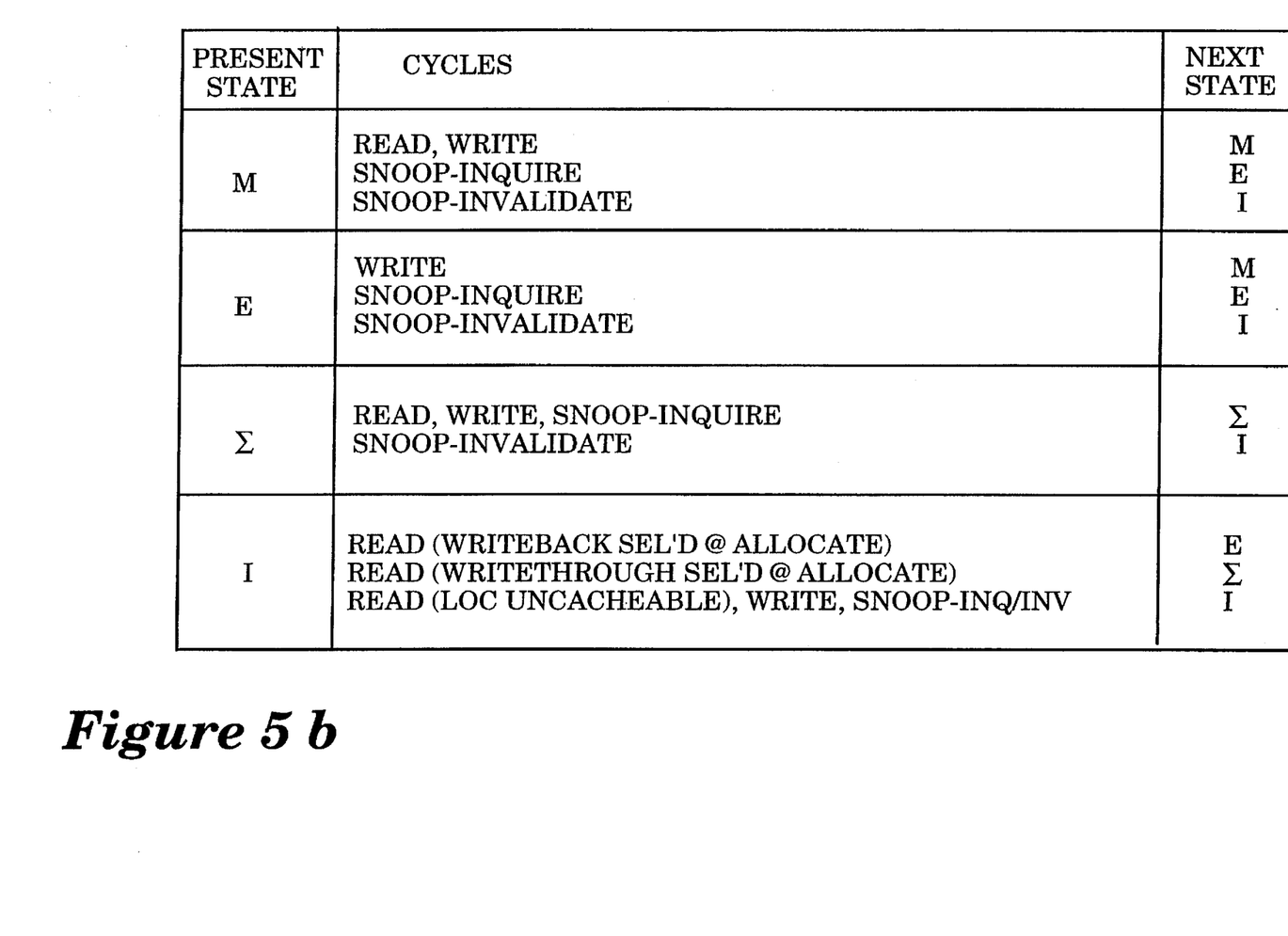

Referring now to FIGS. 5a–5b, two diagrams illustrating the streamlined four state MEΣI cache coherency protocol of the present invention is shown. As illustrated in FIG. 5a, the MEΣI cache coherency protocol comprises four states, a modified state (M), an exclusive state (E), a pseudo "shared" state (Σ), and an invalid state (I). The M state indicates that the cache line is allocated with the write back characteristic and has been changed since it was first allocated, thus out of sync with memory. The E state indicates that the cache line is allocated with the write back characteristic and has not been changed since it was first allocated, thus still in sync with memory. The Σ state indicates that the cache line is allocated with the write through characteristic, thus always in sync with memory (regardless whether it has been written into since it was allocated). The I state indicates the data in the cache line is invalid, effectively unallocated.

During operation, a cache line will enter either the E state or Σ state when it is first allocated depending on whether the WB/WT# signal is asserted high or not. However, after allocating a cache line in the Σ state, no bus cycle will be generated to broadcast the allocation. (The broadcast is performed under MESI to inform the other processors, if they exist, to change their corresponding cache lines to the "shared" state also. It is performed in the uniprocessor environment as well as in the multiprocessor environment regardless of whether it is necessary or not.)

As illustrated in FIG. 5b, once in the E state, the cache line will remain in the E state if it is read or snoop-inquired. A snoop-inquire is usually issued when another device issues a read cycle to memory. The E state cache line will transition into the M state if it is written into, however no bus cycle will be generated to write the data into memory. The E state cache line will transition into the I state if it is snoop-invalidated. The snoop-invalidate is usually issued when another device issues a write cycle to memory. On the other hand, once in the Σ state, the cache line will remain in the Σ state if it is read, written into, or snoop-inquired. A bus cycle will be generated to write the data into memory if the Σ state cache line is written into. Subsequent writes to cache lines in E and M states will be stalled until the write through to memory is actually completed. After the write through is actually completed, no bus cycle will be generated to check if the Σ state cache line is still being "shared". (The checking is performed under MESI to determine if it is okay to change the cache line into the E state instead, thereby reducing unnecessary write throughs to memory.) The Σ state cache line will transition into the I state if it is snoop-invalidated.

Once in the M state, the cache line will remain in the M state whether it is read or written into. However, no bus cycle will be generated to write the data into memory, even when it is written into. The M state cache line will transition into the E state if it is snoop-inquired. A bus cycle will be generated to write the data into memory. The M state cache line will transition into the I state if it is snoop-invalidated. Once in the I state, the cache line will remain in the I state if an attempt is made to read the cache line and the memory locations are uncacheable, to write into the cache line, or to snoop the cache line (both snoop-inquire and snoop-invalidate). An attempt to write into the I state cache line will cause a bus cycle to be generated to write the data into memory, but will not cause the cache line to be allocated.

Subsequent writes to cache lines in E and M states will also be stalled until the write through to memory is actually completed. The I state cache line will transition into either the E state or the Σ state, depending on the state of the WB/WT# signal if an attempt is made to read the cache line and the memory locations are cacheable. Bus cycles will be generated to allocate and fill a cache line accordingly.

Thus, under the streamlined four state MEΣI cache coherency protocol of the present invention, there are two less state transitions for the cache controller 18 to handle, between the E and Σ states. Additionally, as described earlier, the cache controller 18 does not have to broadcast a cache line's allocation after allocating the cache line into the Σ state, nor check to determine if the cache line is still "shared" after writing data through into memory. It will be appreciated that the elimination of the broadcasting of a cache line's allocation into the "shared" state also results in the savings of a pin. Furthermore, by changing the S state into the Σ state, leading write through bus cycles are saved for the write back cache lines under various situations, thereby improving performance. For example, under the prior art MESI protocol, when an E state cache line is snoop-inquired, the E state cache line transitions into the S state. Thus, a subsequent write into the now S state cache line will cause a write through into the memory even though it was originally allocated with the write back characteristics (E state). However, under the streamlined MEΣI protocol, the E state cache line remains in the E state when it is snoop-inquired. Therefore, the subsequent write will not be written back.

It will be appreciated that no special configuration registers or other hardware is required to implement the streamlined four state MEΣI cache coherency protocol of the present invention. Thus, the above advantages over the prior art MESI protocol is achieved without the disadvantages of the prior art three state protocols as desired.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In an uniprocessor computer system comprising a processor, a cache memory, a main memory, and an input/output (I/O) device, wherein said processor and said I/O device both making independent accesses to said main memory, an improved cache controller for controlling said cache memory and maintaining coherency between said cache and main memory, the improvement comprising means for assigning a pseudo shared state (Σ) to a first cache line of said cache memory when said first cache line is allocated with a write through characteristic, maintaining said first cache line in said Σ state if a subsequent action performed against said first cache line is a selected one of a read action, a write action and a snoop action after a read action while said first cache line is in said Σ state, and reassigning said first cache line into an invalid state (I) if said first cache line is snooped following a write cycle while said first cache line is in said Σ state.

2. The improved cache controller of claim 1, wherein, said means further causes any data written into said first cache line while said first cache line is in said Σ state to be written into said main memory immediately.

3. The improved cache controller of claim 2, wherein, said means further assigns an exclusive state (E) to a second cache line of said cache memory when said second cache line is allocated with a write back characteristic, maintaining said second cache line in said E state if a subsequent action performed against said second cache line is a selected one of a read action and a snoop action following a read action while said second cache line is in said E state, and reassigning said second cache line into a modified state (M) if said second cache line is written into while said second cache line is in said E state, and reassigning said second cache line into said invalid state (I) if said second cache line is snooped following a write cycle while said second cache line is in said E state.

4. The improved cache controller of claim 3, wherein, said means further maintains said second cache line in said M state if a subsequent action performed against said second cache line is a selected one of a read action and a write action while said second cache line is in said M state, reassigning said second cache line into said E state if said second cache line is snooped following a read cycle while said second cache line is in said M state, and reassigning said second cache line into said I state if said second cache line is snooped following a write cycle while said second cache line is in said M state.

5. The improved cache controller of claim 4, wherein, if said means had caused a write through to said main memory in response to a write to said first cache line while said first cache line is in said Σ state, said means further causes a write to said second cache line while said second cache line is in a selected one of said E and said M states to be held off until the write through to said memory is actually completed.

6. The improved cache controller of claim 5, wherein, said means further maintains said first cache line in said I state if a subsequent action performed against said first cache line is a read with an uncacheable source address action, a write action and a snoop action while said first cache line is in said I state, reassigning said first cache line into said E state if said first cache line is read with a write back characteristic while said first cache line is in said I state, and reassigning said first cache line into said Σ state if said first cache line is read with a write through characteristic while said first cache line is in said I state;

said means also maintains said second cache line in said I state if a subsequent action performed against said second cache line is a read with an uncacheable source address action, a write action and a snoop action while said second cache line is in said I state, reassigning said second cache line into said E state if said second cache line is read with a write back characteristic while said second cache line is in said I state, and reassigning said second cache line into said Σ state if said second cache line is read with a write through characteristic while said second cache line is in said I state.

7. The improved cache controller of claim 6, wherein, said means further causes any data written into said first cache line while said first cache line is in said I state to be written immediately into said main memory respectively;

said means further causes any data written into said second cache line while said second cache line is in said I state to be written immediately into said main memory respectively.

8. The improved cache controller of claim 7, wherein, if said means had caused a write through to said main memory in response to a write to said first cache line while said first cache line is in said I state, said means further causes a write to said second cache line while said second cache line in a selected one of said E and said M states to be held off until the write through to said memory is actually completed.

9. The improved cache controller of claim 8, wherein, said processor, said improved cache controller, and said cache memory are integrated in a single silicon based chip.

10. In an uniprocessor computer system comprising a processor, a cache memory, a main memory, and an input/output (I/O) device, wherein said processor and said I/O device both making independent accesses to said main memory, an improved cache controller for controlling said cache memory and maintaining coherency between said cache and main memory, the improvement comprising circuitry for assigning a pseudo shared state ($\Sigma$) to a first cache line of said cache memory when said first cache line is allocated with a write through characteristic, maintaining said first cache line in said $\Sigma$ state if a subsequent action performed against said first cache line is a selected one of a read action, a write action and a snoop action following a read action while said first cache line is in said $\Sigma$ state, and reassigning said first cache line into an invalid state (I) if said first cache line is snooped following a write cycle while said first cache line is in said $\Sigma$ state.

11. The improved cache controller of claim 10, wherein, said circuitry further assigns an exclusive state (E) to a second cache line of said cache memory when said second cache line is allocated with a write back characteristic, maintaining said second cache line in said E state if a subsequent action performed against said second cache line is a selected one of a read action and a snoop action while said second cache line is in said E state, reassigning said second cache line into a modified state (M) if said second cache line is written into while said second cache line is in said E state, and reassigning said second cache line into said invalid state (I) if said second cache line is snooped following a write cycle while said second cache line is in said E state.

12. The improved cache controller of claim 11, wherein, said circuitry further maintains said second cache line in said M state if a subsequent action performed against said second cache line is a selected one of a read and a write action while said second cache line is in said M state, and reassigning said second cache line into said E state if said second cache line is snooped following a read cycle while said second cache line is in said M state, and reassigning said second cache line into said I state if said second cache line is snooped following a write cycle while said second cache line is in said M state.

13. The improved cache controller of claim 12, wherein,
said circuitry further maintains said first cache line in said I state if a subsequent action performed against said first cache line is a selected one of a read with an uncacheable source address action, a write action and a snoop action while said first cache line is in said I state, reassigning said first cache line into said E state if said first cache line is read with a write back characteristic while said first cache line is in said I state, and reassigning said first cache line into said $\Sigma$ state if said first cache line is read with a write through characteristic while said first cache line is in said I state;

said circuitry also maintains said second cache line in said I state if a subsequent action performed against said second cache line is a selected one of a read with an uncacheable source address action, a write action and a snoop action while said second cache line is in said I state, reassigning said second cache line into said E state if said second cache line is read with a write back characteristic while said second cache line is in said I state, and reassigning said second cache line. into said $\Sigma$ state if said second cache line is read with a write through characteristic while said second cache line is in said I state.

14. In an uniprocessor computer system comprising a processor, a cache memory, a main memory, and an input/output (I/O) device, wherein said processor and said I/O device both making independent accesses to said main memory, an improved method for controlling said cache memory and maintaining coherency between said cache and main memory, the improvement method comprising the steps of:

assigning a pseudo shared state ($\Sigma$) to a first cache line of said cache memory when said first cache line is allocated with a write through characteristic, maintaining said first cache line in said $\Sigma$ state if a subsequent action performed against said first cache line is a selected one of a read action, a write action and a snoop action following a read action while said first cache line is in said $\Sigma$ state, and reassigning said first cache line into an invalid state (I) if said first cache line is snooped following a write cycle while said first cache line is in said $\Sigma$ state.

15. The improved method of claim 14, wherein, the improvement further comprises the steps of:

assigning an exclusive state (E) to a second cache line of said cache memory when said second cache line is allocated with a write back characteristic, maintaining said second cache line in said E state if a subsequent action performed against said second cache line is a selected one of a read action and a snoop action followed by a read action while said second cache line is in said E state, reassigning said second cache line into a modified state (M) if said second cache line is written into while said second cache line is in said E state, and reassigning said second cache line into said invalid state (I) if said second cache line is snooped following a write cycle while said second cache line is in said E state.

16. The improved method of claim 15, wherein, the improvement further comprises the steps of:

maintaining said second cache line in said M state if a subsequent action performed against said second cache line is a selected one of a a read action and a write action while said second cache line is in said M state, reassigning said second cache line into said E state if said second cache line is snooped following a read cycle while said second cache line is in said M state, and reassigning said second cache line into said I state if said second cache line is snooped following a write cycle while said second cache line is in said M state.

17. The improved cache controller of claim 16, wherein, the improvement further comprises the steps of:

maintaining said first cache line in said I state if a subsequent action performed against said first cache line is a selected one of a read with an uncacheable source address action, a write action and a snoop action while said first cache line is in said I state, reassigning said first cache line into said E state if said first cache line is read with a write back characteristic while said first cache line is in said I state, reassigning said first ache line into said $\Sigma$ state if said first cache line is read with a write through characteristic while said first cache line is in said I state, maintaining said second cache line in said I state if a subsequent action performed against said second cache line is a selected one a read with an uncacheable source address action, a write action and a snoop action while said second cache line is in said I state, reassigning said second cache line into said E state if said second cache line is read with a write back characteristic while said second cache line is in said I state, and reassigning said second cache line into said Σ state if said second cache line is read with a write through characteristic while said second cache line is in said I state.

18. In an uniprocessor computer system comprising a processor, a main memory for storing data, and an input/output (I/O) device, wherein said processor and said I/O device both making independent accesses to said main memory, a cache subsystem comprising:

a cache memory coupled to said processor and said memory for caching a subset of the stored data of said main memory; and an improved cache controller coupled to said cache memory for controlling said cache memory and maintaining coherency between said cache and main memory, the improvement comprising circuitry for assigning a pseudo shared state (Σ) to a first cache line of said cache memory when said first cache line is allocated with a write through characteristic, maintaining said first cache line in said Σ state if a subsequent action performed against said first cache line is a selected one of a read action, a write action and a snoop action following a read cycle while said first cache line is in said Σ state, and reassigning said first cache line into an invalid state (I) if said first cache line is snooped following a write cycle while said first cache line is in said Σ state.

19. An uniprocessor computer system comprising:

a processor for executing instructions;

a main memory for storing instructions and data;

a cache memory coupled to said processor and said memory for caching a subset of the stored instructions and data of said main memory, said processor making accesses to said main memory;

an input/output (I/O) device for performing input and output, said I/O device making independent accesses to said main memory;

an improved cache controller coupled to said cache memory for controlling said cache memory and maintaining coherency between said cache and main memory, the improvement comprising circuitry for assigning a pseudo shared state (Σ) to a first cache line of said cache memory when said first cache line is allocated with a write through characteristic, maintaining said first cache line in said Σ state if a subsequent action performed against said first cache line is a selected one of a read action, a write action and a snoop action following a read action while said first cache line is in said Σ state, and reassigning said first cache line into an invalid state (I) if said first cache line is snooped following a write cycle while said first cache line is in said Σ state.

* * * * *

UNITED STATES PATENT AND TRADEMARK OFFICE
CERTIFICATE OF CORRECTION

PATENT NO.   : 5,522,057
DATED        : May 28, 1996
INVENTOR(S)  : Joe Lichy

It is certified that error appears in the above-identified patent and that said Letters Patent is hereby corrected as shown below:

In column 8 at line 54 delete "cache controller" and insert --method--

Signed and Sealed this

Twenty-fifth Day of February, 1997

*Attest:*

BRUCE LEHMAN

*Attesting Officer*   *Commissioner of Patents and Trademarks*